United States Patent
Manevich et al.

(10) Patent No.: US 12,020,242 B2
(45) Date of Patent: Jun. 25, 2024

(54) FAIR TRANSACTION ORDERING IN BLOCKCHAINS

(71) Applicant: International Business Machines Corporation, Armonk, NY (US)

(72) Inventors: Yacov Manevich, Haifa (IL); Artem Barger, Haifa (IL)

(73) Assignee: International Business Machines Corporation, Armonk, NY (US)

(*) Notice: Subject to any disclaimer, the term of this patent is extended or adjusted under 35 U.S.C. 154(b) by 465 days.

(21) Appl. No.: 16/056,729

(22) Filed: Aug. 7, 2018

(65) Prior Publication Data

US 2020/0051078 A1    Feb. 13, 2020

(51) Int. Cl.
    *G06Q 20/38*    (2012.01)
    *H04L 9/30*    (2006.01)

(52) U.S. Cl.
    CPC .......... *G06Q 20/3829* (2013.01); *H04L 9/30* (2013.01)

(58) Field of Classification Search
    CPC ...... G06Q 20/10; G06Q 20/40; G06Q 20/389; G06Q 20/387; G06Q 10/10; G06Q 20/409; G06Q 20/18; G06Q 30/0241; G06Q 20/3829; G06F 16/273; G06F 21/6209; G06F 11/34; H04L 9/30
    See application file for complete search history.

(56) References Cited

U.S. PATENT DOCUMENTS

| | | | | |
|---|---|---|---|---|
| 5,841,984 | A * | 11/1998 | Marine | G06F 9/466 709/226 |
| 6,061,734 | A * | 5/2000 | London | H04L 63/10 380/29 |
| 10,818,121 | B2 * | 10/2020 | Unagami | G06F 21/64 |
| 2005/0211772 | A1 * | 9/2005 | Nakamura | G06Q 10/087 235/383 |
| 2008/0256073 | A1 * | 10/2008 | Detlefs | G06F 9/528 |
| 2015/0112872 | A1 * | 4/2015 | Sadiq | G06Q 20/409 705/72 |
| 2016/0321654 | A1 | 11/2016 | Lesavich et al. | |
| 2016/0350749 | A1 | 12/2016 | Wilkins et al. | |
| 2017/0032478 | A1 * | 2/2017 | Kraft | G06Q 20/202 |
| 2017/0236120 | A1 * | 8/2017 | Herlihy | G06Q 20/065 705/67 |
| 2018/0285983 | A1 * | 10/2018 | Franaszek | G06Q 40/12 |
| 2020/0051078 | A1 * | 2/2020 | Manevich | H04L 9/3239 |
| 2020/0112445 | A1 * | 4/2020 | Yoshihama | G06Q 20/02 |

FOREIGN PATENT DOCUMENTS

WO    2017192837 A1    11/2017
WO    WO-2017192837 A1 *    11/2017    .......... G06Q 20/065

OTHER PUBLICATIONS

Antonopoulos, Mastering Bitcoin, 2014 (Year: 2014).*

(Continued)

*Primary Examiner* — Jacob C. Coppola

(57) ABSTRACT

An example operation may include one or more of a computer generating an output of a variable random function applied to a public key of a user of a blockchain and a hash of the blockchain block, the computer determining a function f that gives a number x in [0,1] to each of a plurality of transactions on the block based on the output, and the computer ordering the transactions, using the function f, within the block.

14 Claims, 10 Drawing Sheets

(56) References Cited

OTHER PUBLICATIONS

Yaga, Blockchain Technology Overview NISTIR 8202, 2018 (Year: 2018).*

Saad, "Processing Transaction in a Predefined Order", 2018 (Year: 2018).*

Papadopoulos et al., "Making NSEC5 Practical for DNSSEC," Cryptology ePrint Archive, Paper 2017/099, found at https://eprint.iacr.org/2017/099, all pages. (Year: 2017).*

D. Larimer, "How BitShares Prevents Front Running" Jan. 29, 2015. [Accessed Feb. 5, 2018].https://web.archive.org/web/20150202052840/https://bytemaster.bitshares.org/article/2015/01/29/How-BitShares-Prevents-Front-Running/.

J. Danneman, "Blockchain Just Became Obsolete. The Future is Hashgraph," Oct. 25, 2017https://medium.com/@justindanneman/blockchain-just-became-obsolete-the-future-is-hashgraph-de4948609cbf [Accessed Feb. 5, 2018].

K. Atlas, "Canonical input and output ordering in transactions." Wed Jun. 24, 2022:09:32 UTC 2015, https://lists.linuxfoundation.org/pipermail/bitcoin-dev/2015-June/009054.html[Accessed Feb. 5, 2018].

S. Goel, "System and Methods for Enabling Prioritization in Permissioned Blockchain Networks." IBM Invention P201704237, 2017, Submitted. Patent Professional Assigned: Joseph Petrokaitis.

S. Micali, "Verifiable random functions." In Proceedings of the 40th Annual Symposium on the Foundations of Computer Science (FOCS '99), 120-130. New York: IEEE Computer Society Press, 1999.

Taek, "Sublinear Consensus." Oct. 9, 2014, [Accessed Feb. 5, 2018]. https://bitcointalk.org/index.php?topic=154290.0;prev_next=next.

J. Kurokawa, "The problem with Augur, Bitshares, Nxt, and Counterparty." Jun. 12, 2015 [Accessed Feb. 5, 2018]. http://www.kkurokawa.com/2015/06/front-running-decentralized-exchanges.html.

Y. Gilad, "Algorand: Scaling Byzantine Agreements for Cryptocurrencies." In Proceedings of the 26th Symposium on Operating Systems Principles (SOSP '17). ACM, New York, NY, USA, 51-68. 2017.

* cited by examiner

FAIR TRANSACTION ORDERING IN BLOCKCHAINS

TECHNICAL FIELD

This application generally relates to placement of transactions in blocks for insertion into blockchains, and more particularly, to fair transaction ordering in blockchains.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in a blockchain's blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

A blockchain is a public electronic ledger that can be openly shared among disparate users. An unchangeable record of the users' transactions is created. Each transaction is time-stamped and linked to previous transactions. Blocks in a blockchain are created by aggregating a set of transactions, ordering the blocks, and inserting the blocks into the network of a blockchain.

The ordering of transactions in a block may be arbitrarily set or may be based on properties of associated transactions. Creators of blocks may receive fees for placing transactions in a block. In some blockchain systems, the node or participant that decides on the next block containing transactions may determine the order of transactions within the block. The participant's own preferences may factor into such decisions regarding transaction order. When blocks are subsequently determined to be valid, the blocks are processed by the blockchain participants in the order that the transactions appear in the block.

Participants may have bias toward some subsets of transaction submitters, thus making the process of transaction ordering exploitable. Bias present in the ordering of transactions may impose important implications when order of transaction execution from new blocks may have non-commutative semantics, such as in auctioning and bidding.

Conventionally, fairness in transaction ordering in blocks may be limited by user bias. As such, what is needed are measures to overcome such bias.

SUMMARY

One example embodiment may provide a method that includes one or more of a computer generating an output of a verifiable random function applied to a public key of a user of a blockchain and a hash of the blockchain block, the computer determining a function f that gives a number x in [0,1] to each of a plurality of transactions on the block based on the output, and the computer ordering the transactions, using the function f, within the block.

Another example embodiment may provide a system that includes a processor and memory, wherein the processor is configured to one or more of generate an output of a verifiable random function applied to a public key of a user of a blockchain and a hash of the blockchain block, determine a function f that gives a number x in [0,1] to each of a plurality of transactions on the block based on the output, and order the transactions, using the function f, within the block.

A further example embodiment may provide a non-transitory computer readable medium comprising instructions, that when read by a processor, cause the processor to perform one or more of generating an output of a verifiable random function applied to a public key of a user of a blockchain and a hash of the blockchain block, determining a function f that gives a number x in [0,1] to each of a plurality of transactions on the block based on the output, and ordering the transactions, using the function f, within the block.

DETAILED DESCRIPTION

Figure 1:
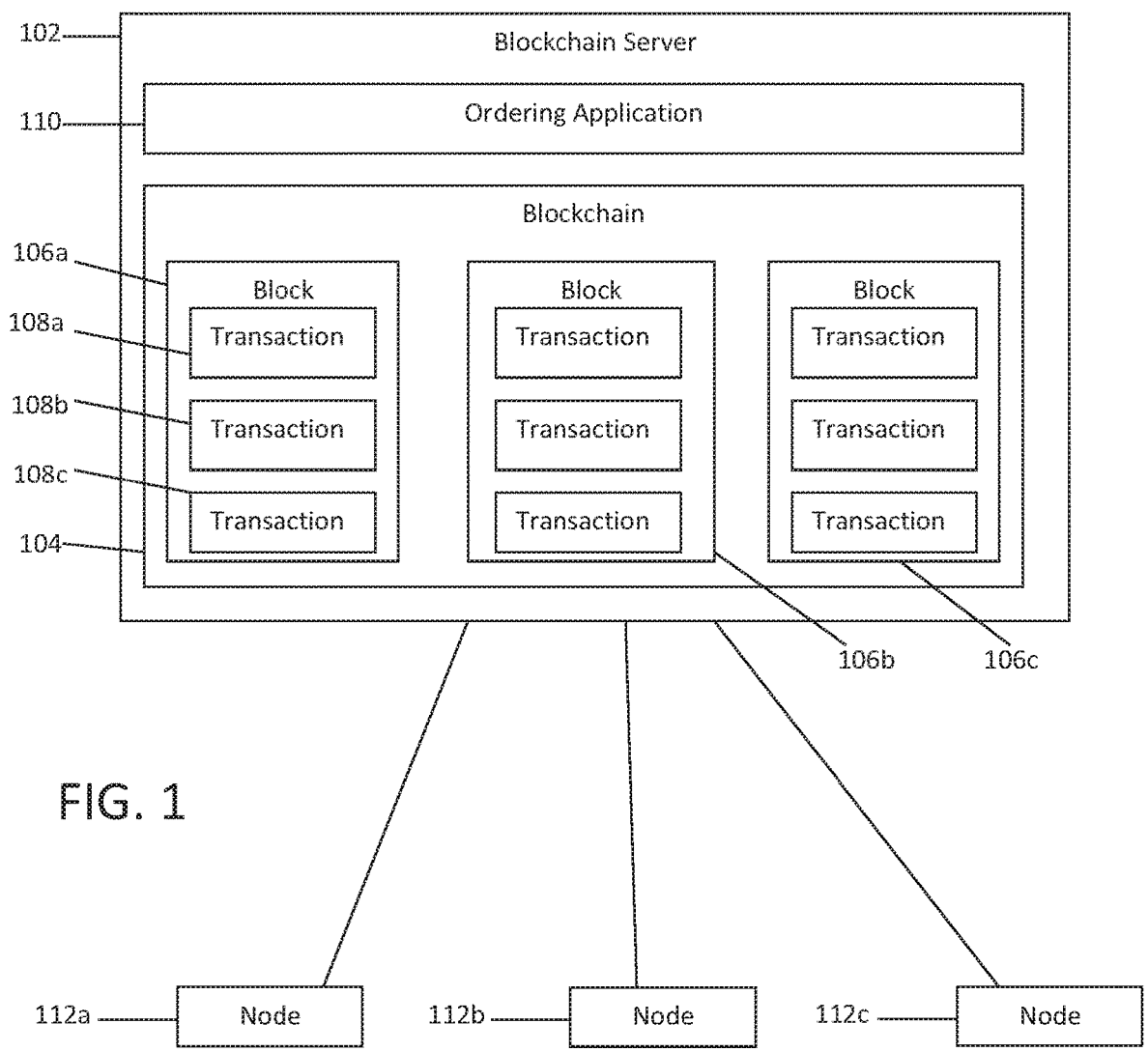
FIG. 1 illustrates a network diagram of a system for fair transaction ordering in blockchains, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide fair transaction ordering in blockchains.

Systems and methods described herein provide for mitigation of leverage of nodes responsible for creating a next block in a blockchain when such nodes have the ability to determine order of transactions within the block. Transactions may be ordered based on provided systems and methods, thus promoting fairness.

At least one application provided herein executing on a computer generates an output of a verifiable random function (VRF). The VRF is applied to a public key of a blockchain user and a hash of block of the user. The application determines a function f that gives a number x in [0,1] to each transaction in the block based on the output. The computer then orders the transactions within the block using the function f.

Use of the function f mitigates effects of bias by nodes on ordering of the transactions. The function f promotes fairness of ordering such that transactions of submitters are included in the block. The application ensures that transactions are ordered uniformly in the block. Upon determining that a transaction has been submitted, the application associates the transaction to the hash of the last known block and does so by including the hash inside a signed payload.

In case the last known block is not the last known block in practice, the transaction will be invalidated. The transaction will then either not be included in the block. Alternatively, the transaction will be marked as invalid in all the nodes that process the block in which the transaction is to be included.

The initial or genesis block of the blockchain is selected with a payload randomly selected by a majority of participants. A variation of a distributed random number generation algorithm may be used to achieve such selection of genesis block. For example, each node that participates in bootstrapping may send a random string. All random strings are concatenated by their lexicographical order to produce a string S. The string S is then hashed, and the hash is used as a random seed to the genesis block.

The instant application in one embodiment relates to placement of transactions in blocks for insertion into blockchains, and in another embodiment relates to fair transaction ordering in blockchains.

Turning to the figures, FIG. 1 is a block diagram of a system for transaction ordering in a blockchain according to an embodiment of the present disclosure. FIG. 1 depicts components and interactions of a system 100 comprising a blockchain server 102, a blockchain 104, blocks 106a-c, transactions 108a-c, an ordering application 110, and nodes 112a-c. The blockchain server 102 and the ordering application 110 may be referred to hereafter for brevity purposes as the server 102 and the application 110, respectively.

It is assumed that each of blocks 106a-c comprises many transactions 108a-c, in embodiments many more than three per block 106a-c. While only three each of blocks 106a-c and nodes 112a-c are depicted in FIG. 1, it is assumed that a large number of blocks 106a-c and nodes 112a-c are present in the system 100. While the blockchain 104 and its blocks 106a-c and transactions 108a-i are depicted in FIG. 1 as resident and executing on the server 102, in embodiments these components may execute elsewhere on at least one other physical device separate from the server 102.

Transactions 108a-c are depicted in FIG. 1 only for block 106a so as not to unnecessarily crowd FIG. 1. But each of block 108b and block 108c may contain a multitude of transactions 108a-c in the same manner as does block 106a.

References herein to users or participants may in embodiments be equivalent to nodes 112a-c such that a user or participant described as submitting a transaction 108a-c for inclusion in block 106a-c may be assumed to be the actions of one of nodes 112a-c. In embodiments, more than one user or participant may be associated with a single node 112a-c. The terms user, participant, and node 112a-c may be used interchangeably herein.

Discussion about any of blocks 106a-c is assumed to apply to all blocks 106a-c unless otherwise stated. Discussion about any of transactions 108a-c is assumed to apply to all of transactions 108a-c unless otherwise stated. Discussion about any of nodes 112a-c is assumed to apply to all of nodes 12a-c unless otherwise stated.

A verifiable random function (VRF) is used. Given input x, an owner of a secret key SK and public key PK may compute $y=F\_SK(x)$, and $\pi$(proof). Based thereon, a party with <PK, $\pi$>can verify whether $\pi$(PK, x, y) is true without interaction with the owner of SK. In addition, $F\_SK(x)$ is pseudo-random.

Verifiable random functions may be employed as follows: Given a cryptographic hash function H and a transaction 108a submitted by user u with public key PK_u that corresponds to a previous block B_i with hash H(B_i), while the successor block 106a is denoted B_(i+1), consequently:

$$x, \pi \leftarrow VRF_u(H(B_i) \| PK_u)$$

The value x and π are put inside the transaction 108a, particularly in the signed payload. Neither a user u nor the node 112a that orders transactions 108a-c in the block 106a has control over the output of $$VRF_u(H(B_i)\|PK_u)$$

given it is included in the block 106a that is an immediate successor to B. This is because in our model, H(B_i) and PK_u are predetermined before B (i+1) is assembled.

In our model, if $PK_u$ did not exist in the time of block $B_i$, user u cannot issue a transaction 108a because it does not exist in the blockchain 104 at the time. The user will therefore only be able to issue a transaction 108a that will be ordered in some block $B_{i+1+j}$ for some j>0.

Any node 112a may verify that the value of x was computed correctly by u, given π, $PK_u$, $H(B_i)$.
There cannot be $y_1 \neq y_2$ s·t $\pi(PK_w, H(B_i)\|PK_u, y_1)$=true and $\pi(PK_w, H(B_i)\|PK_u, y_2)$=true with non-negligible probability.

When a node 112a receives a block 106a, the node 112a can verify that the block 106a is ordered correctly by applying the same algorithm (the algorithm of ordering the transactions within a block 106a) that the node 112a that produced the block 106a should have executed. This order is deterministic but may be random in appearance to participants and others.

Following is a discussion of constructing an order function f for the transactions in block $B_{i+1}$. Denote $x_u$ the left value (without the proof) of the output of $VRF_u$ (H ($B_i$)||$PK_u$) of user u. Assume that the transactions 108a-c in the block 106a may be enumerated by their users in a manner such that the notation $x_j^i$ refers to the i'th transaction 106a that user j submitted. In an example,
$x_u^0$, $x_u^1$, $x_v^0$, $x_v^1$, $x_v^2$, ... $x_q^0$, $x_q^1$, $x_q^2$ means that user u submitted two transactions 108a-c, user v submitted at least three transactions 108a-c, and user q submitted three transactions 108a-c.

In each transaction 108a-c, the value $x_u$ is computed in the signed payload and has no dependency on the sequence of the transaction 108a-c, or on its content. The priority $P_u$ is computed by taking the binary representation of $x_u$ and prefixing it with "0.0" such that $0.x_u \in [0,1]$. Appending the binary representation of u to the end of the number yields $P_u = 0.x_u$ u.

It is assumed that the representation of x_u is of finite size (i.e. 64 bit or 128 bit) and thus,
if $x_u = x_v$ then $P_u \neq P_v$ since $u \neq v$. Now that the priorities of users that have transactions 108a-c in a given block 106a are known, f uses these priorities to sort the transactions 108a-c inside the block 106a in a manner that achieves fairness, and further takes into account the priority of each user, but also optionally accounts for the number of transactions 108a-c the user may have submitted.

A reason that systems and methods use a VRF and not a simple hash function, or any other function that can be computed deterministically by all participants, is that only user u can compute $VRF_u$. If a user wants to send transaction(s) 108a-c such that the transaction(s) 108a-c will be ordered before transaction(s) 108a-c of some other user v≠u, in block $B_{i+1}$, it cannot know the priority that would be given to v's transaction(s) 108a-i so it has no knowledge whether it should send the transaction 108a-c or not send it.

The reason a VRF is used and not a secure signature scheme is that there may be many valid signatures for a given input Thus it is not deterministic. This would allow a client to sign multiple times until it receives a priority that is very high, and then submit the transaction 108a.

A secure signature scheme is not necessarily pseudo-random, but it is only un-predictable, and thus impairs fairness. To achieve maximal fairness, the output should be pseudo random.

Following are examples of possible constructions off, but it is noted that the disclosure does not limit selection of those described. Numerous approaches that take into account the priorities of a user may be used.

In a naïve round-robin scheme (non-weighted) embodiment, the application 110 may informally take the first transaction 108a-i of the highest priority user, then the first transaction 108a-c of the second highest priority user until one transaction 108a-c is selected from each user. The application 110 may then take the second transaction 108a-c of the highest priority user, then the second transaction 108a-c of the second highest priority user, and so forth.

More formally, the application 110 may denote $T_u^i$ as the transaction i of user u. The application 110 may order the transactions in a matrix such that each user's transactions are arranged in the same column, and that column j is left to column k if and only if P_j>P_k and all transactions 108a-i of a certain user are:

$$
\begin{array}{cccc}
T_u^0 & T_v^0 & \ldots & T_q^0 \\
T_u^1 & T_v^1 & \ldots & T_q^1 \\
\ldots & \ldots & \ldots & \ldots \\
T_u^{|u|} & T_v^{|v|} & \ldots & T_q^{|q|}
\end{array}
$$

Traverse the matrix M and add the transactions 108a-i to a queue Q in the following fashion: Denote the row number of the matrix as R and user num as U.

```
Q=[ ]
row=0
while row<|R|:
    for col:=0; col<U; col++
        Q.enqueue(M[row][col])
    row++
return Q
```

Weighted schemes are also feasible. The round-robin scheme does not consider the number of transactions 108a-c that a user submits into a block 106a-c. In some cases, it may be desirable to impose a penalty associated with submitting an excessive amount of transactions 106a-c.

The order of transactions in the block is defined as follows:
Enumerate the $T_u^i$ transactions 108a-c of a user u: $T_u^0$, $T_u^1$, ..., $T_u^{k-1}$
Denote $P_u^i$ as the priority of $T_u^i$ and k the number of transactions 108a-c in the block 106a-c that u submitted. The transactions 108a-c in the block 106a-c will be ordered by their priorities, or more formally: $T_u^i < T_v^j \Leftrightarrow P_u^i > P_v^j$
Denote $$P_u^i = \frac{i+1}{\sum_{j=0}^{k-1} j+1} P_u$$

and note that $$\sum_{i=0}^{k-1} \frac{i+1}{\sum_{j=0}^{k-1} j+1} = 1,$$

so $P_u$ is divided among the transactions 108a-c of the user u such that the total priority is $P_u=0$.

The series $P_u^i$ descends as k grows, and that $$\sum_{i=0}^{k-1} \frac{i+1}{\sum_{j=0}^{k-1} j+1} = 1$$

for k=1 (single transaction) is 1.

FIG. 1 illustrates a logic network diagram of fair transaction ordering in a blockchain according to example embodiments. Referring to FIG. 1, the network 100 includes a blockchain server 102, a blockchain 104, blocks 106a-c, transactions 108a-c, an ordering application 110, and nodes 112a-c.

Figure 2A:
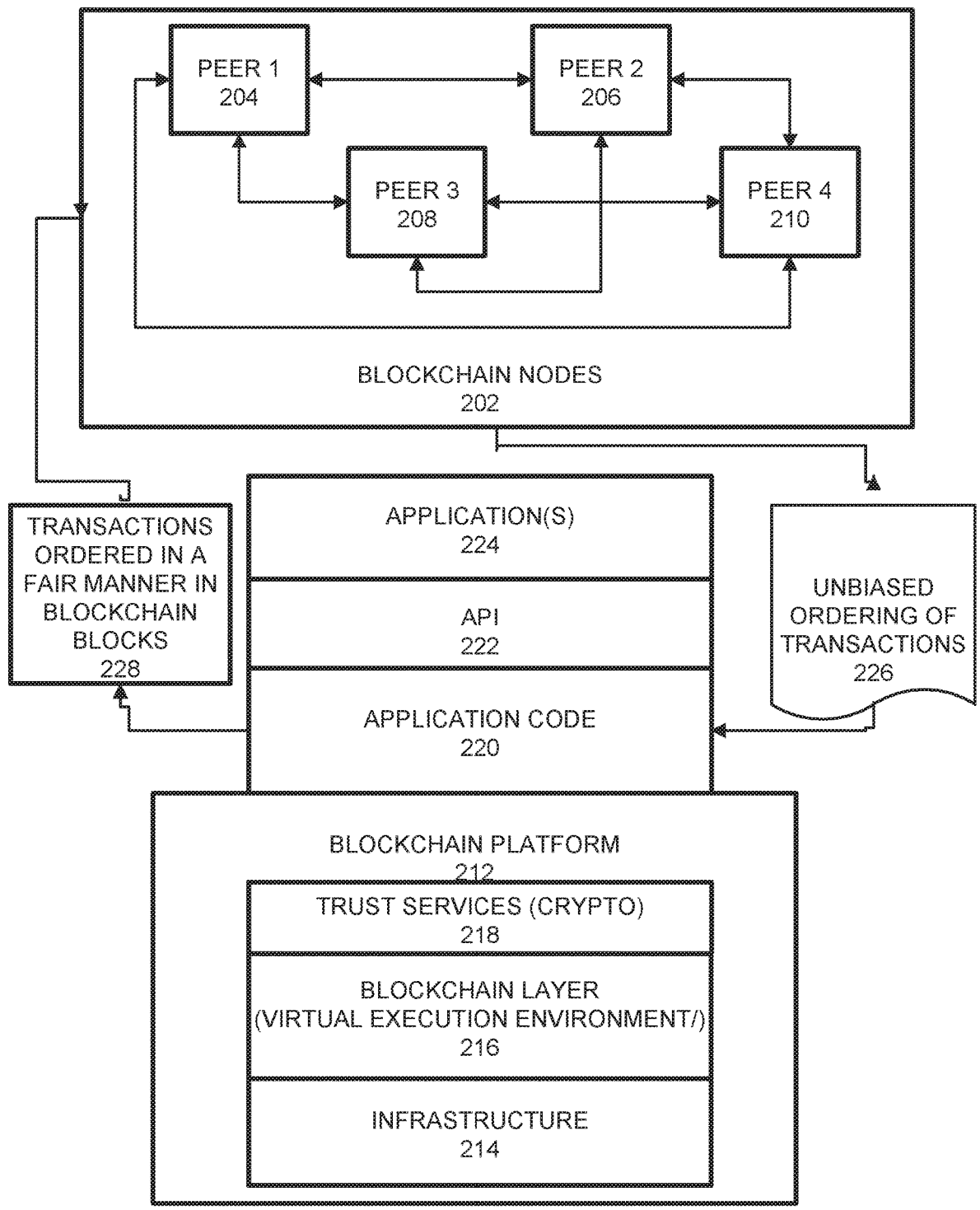
FIG. 2A illustrates an example peer node blockchain architecture configuration for an asset sharing scenario, according to example embodiments.
Figure 2B:
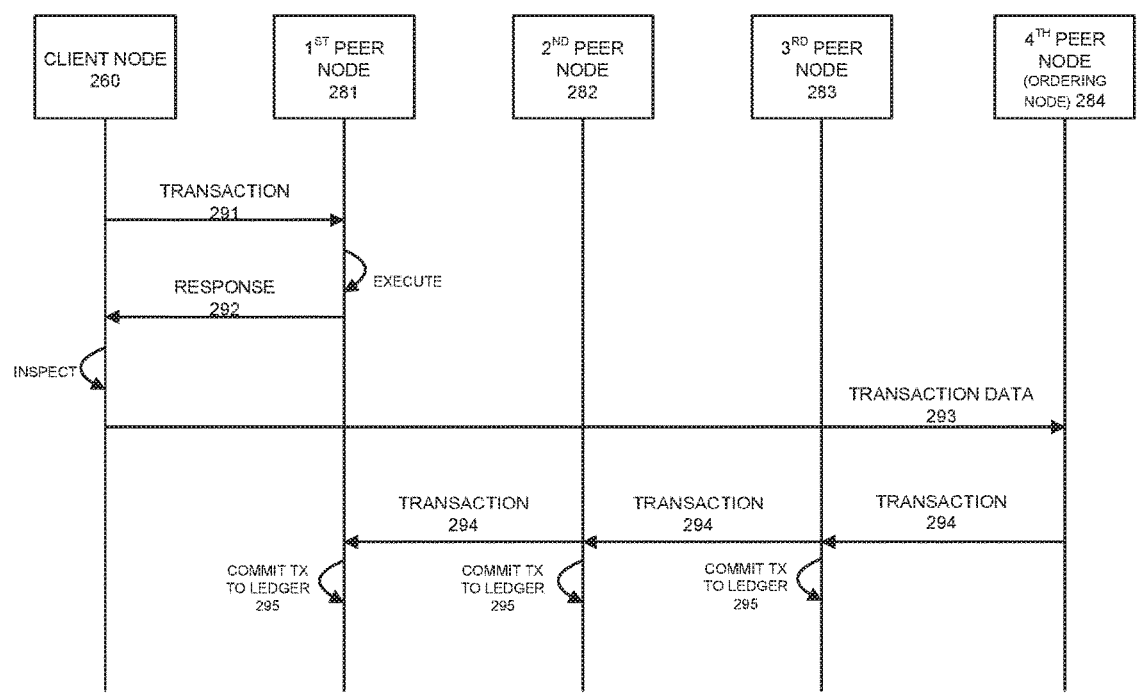
FIG. 2B illustrates an example peer node blockchain configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information input 226 may comprise unbiased ordering of transactions in blockchain blocks may be processed by one or more processing entities (e.g., virtual machines) included in the blockchain layer 216. The result 228 may include transactions ordered in a fair manner in blockchain blocks. The physical infrastructure 214 may be utilized to retrieve any of the data or information described herein.

A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

Figure 3:
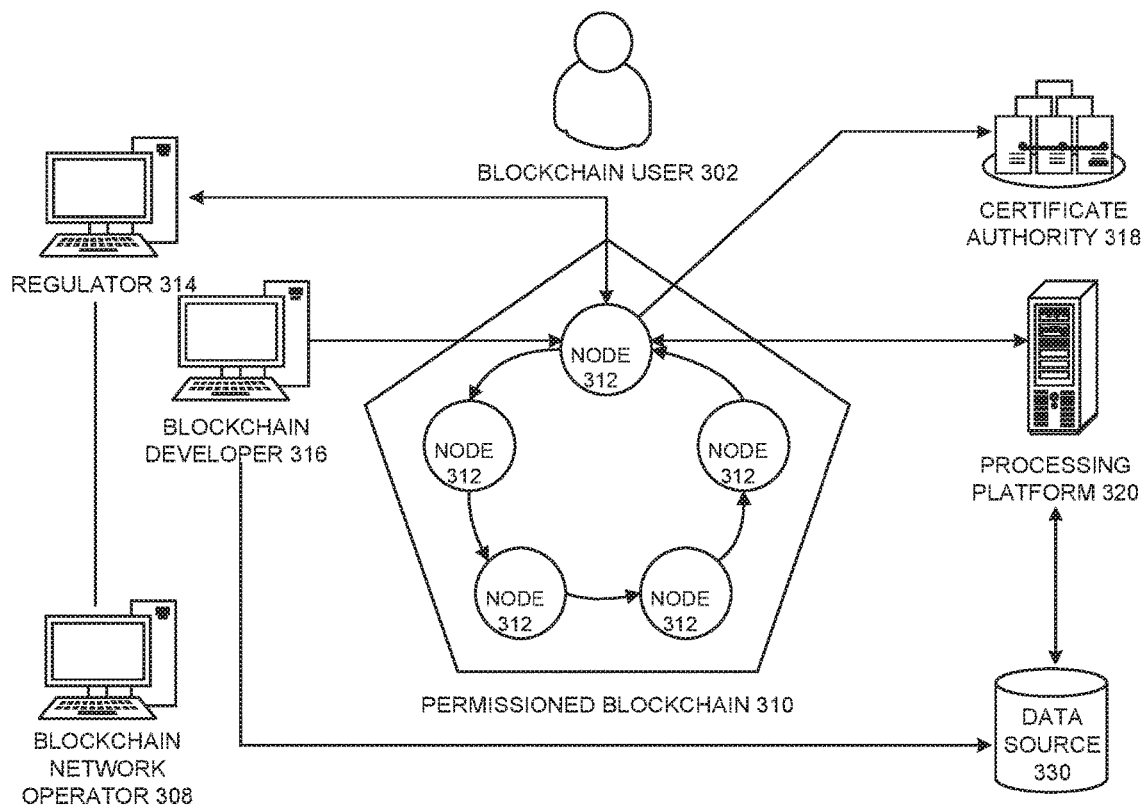
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to send transactions of smart contracts.

Figure 4:
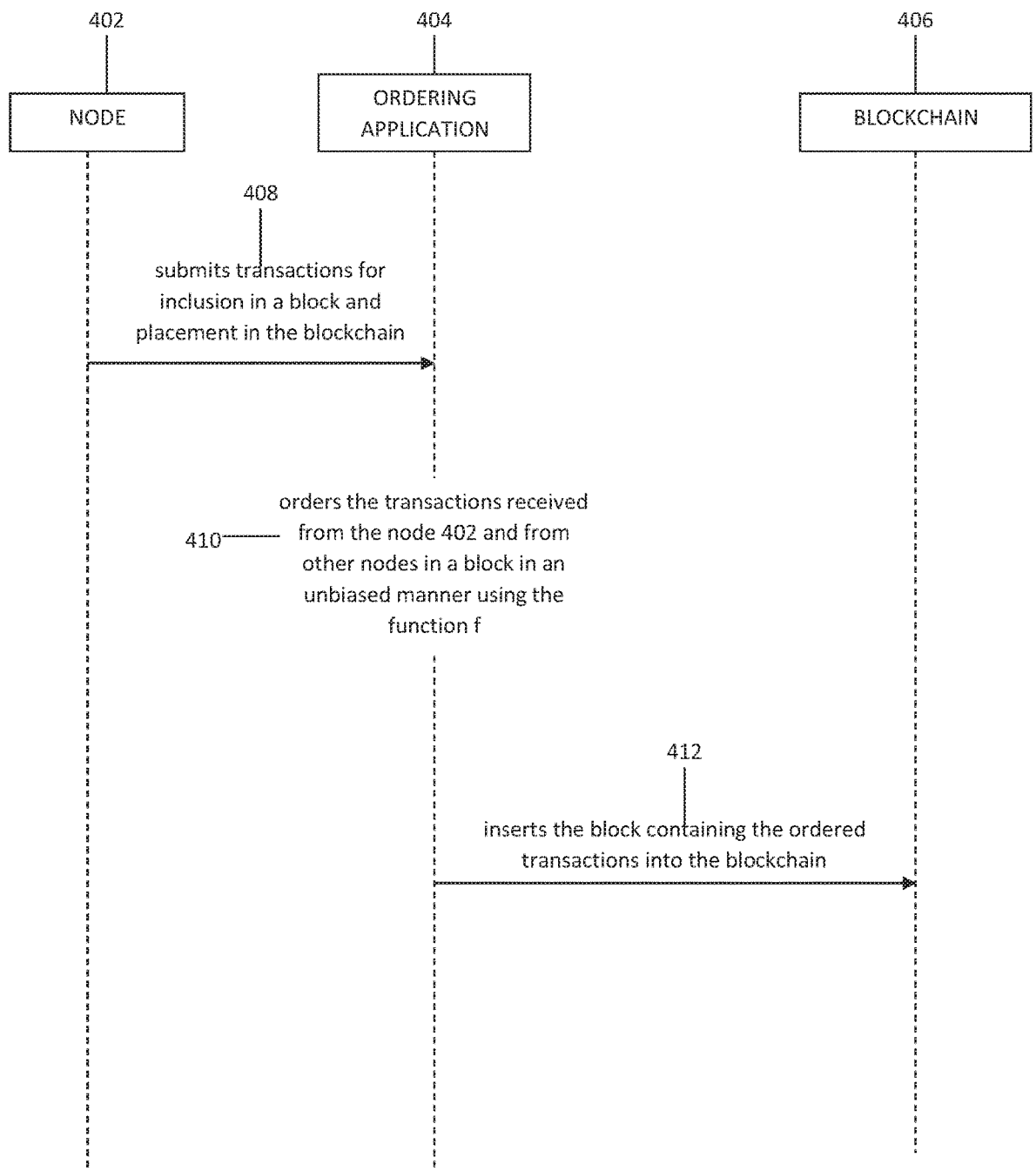
FIG. 4 illustrates a system messaging diagram for performing fair transaction ordering in blockchains, according to example embodiments.

FIG. 4 illustrates a system messaging diagram 400 for performing fair transaction ordering in blockchains. Referring to FIG. 4, the system diagram 400 includes a node 402 that corresponds to the nodes 112a-c provided by the system 100 herein. The system diagram 400 also includes an ordering application 404 that corresponds to the ordering application 110 provided by the system 100 herein. The system diagram 400 also includes a blockchain 406 that corresponds to the blockchain 104 provided by the system 100 herein.

The actions of the diagram 400 begin with the node 402 submitting transactions for inclusion in a block and placement in the blockchain 406. These interactions take place at step 408. The interactions in the diagram 400 continue at step 410 where the ordering application 404 orders the transactions received from the node 402 and from other nodes in a block in an unbiased manner using the function f as described in detail herein. The diagram continues at step 412 where the ordering application 404 inserts the block containing the ordered transactions into the blockchain 406. The interactions of the diagram 400 end.

Figure 5A:
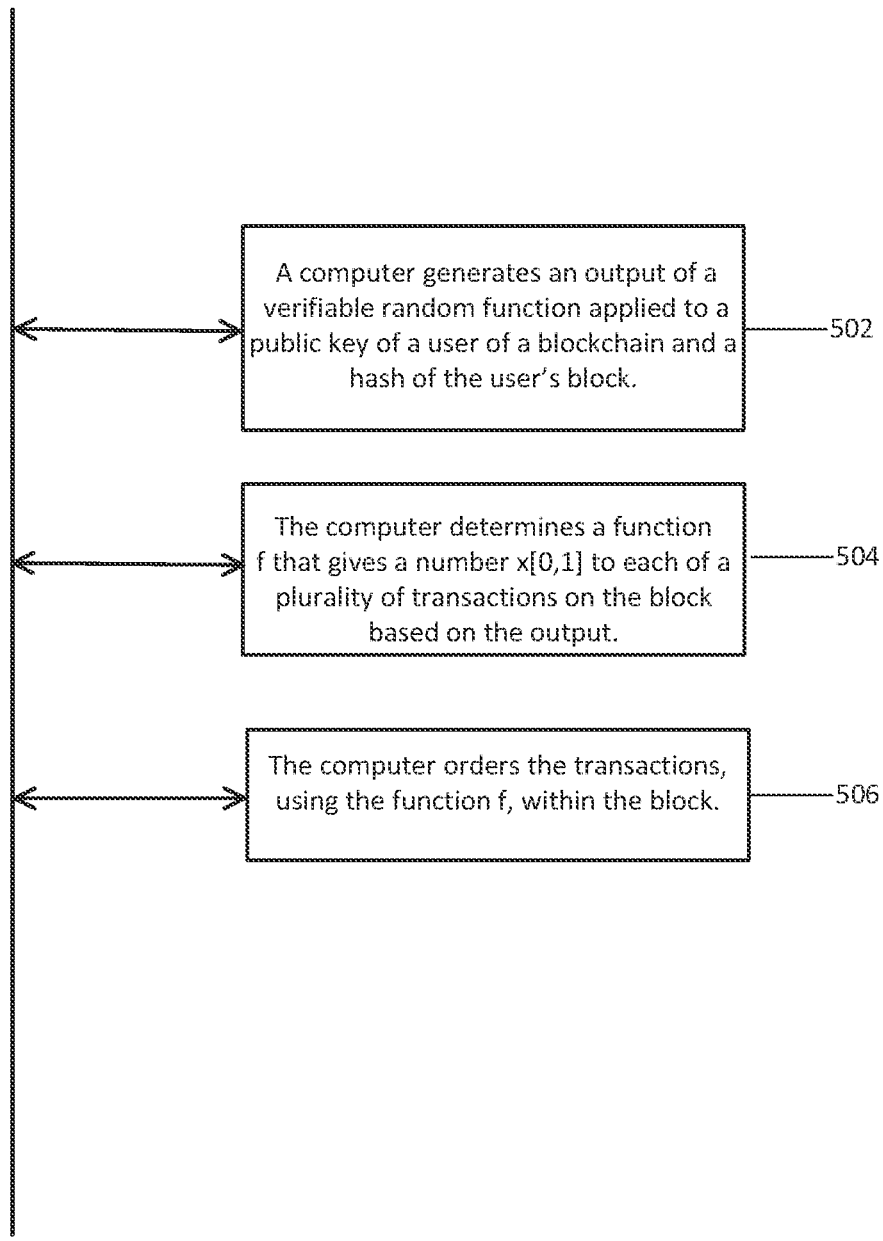
FIG. 5A illustrates a flow diagram of an example method fair transaction ordering in blockchains, according to example embodiments.

FIG. 5A illustrates a flow diagram 500 of an example method of . . . in a blockchain, according to example embodiments. Referring to FIG. 5A, the method 500 begins at block 502 where a computer generates an output of a verifiable random function applied to a public key of a user of a blockchain and a hash of the blockchain block. At block 504, the computer determines a function f that gives a number x in [0,1] to each of a plurality of transactions on the block based on the output. At block 506, the computer orders the transactions, using the function f, within the block. The method 500 thereafter ends.

Figure 5B:
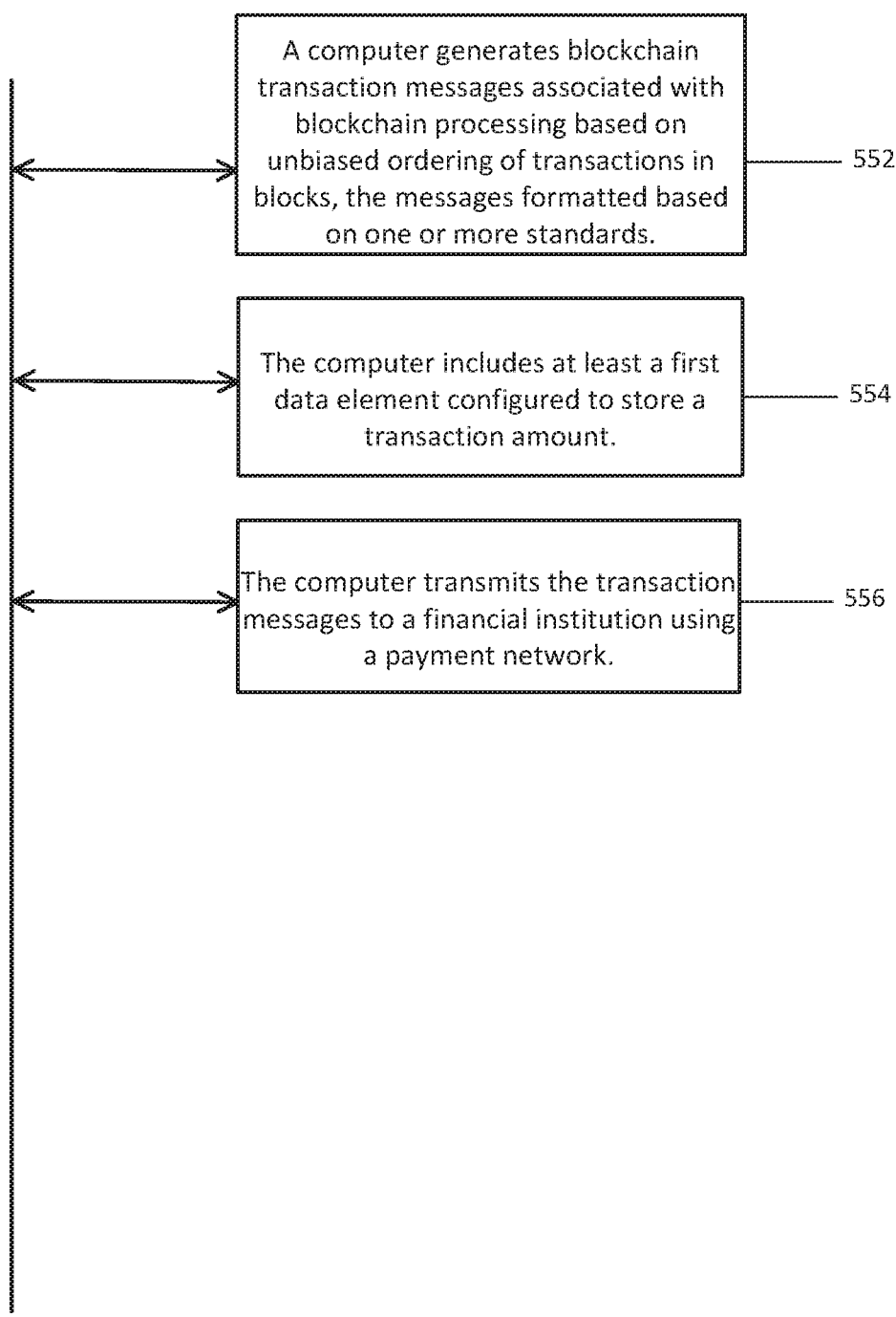
FIG. 5B illustrates a flow diagram of an example method fair transaction ordering in blockchains, according to example embodiments.

FIG. 5B illustrates a flow diagram 550 of an example method of fair transaction ordering in blockchains, according to example embodiments. The example method may supplement steps of the method 500 discussed above. The example method may also include a computer at block 552 generating blockchain transaction messages associated with blockchain processing based on unbiased ordering of transactions in blocks, the messages formatted based on one or more standards. The example method may also include the computer at block 554 including at least a first data element configured to store a transaction amount. The example method may also include the computer at block 556 transmitting the transaction messages to a financial institution using a payment network. The interactions of the flow diagram 550 thereafter end.

Figure 6A:
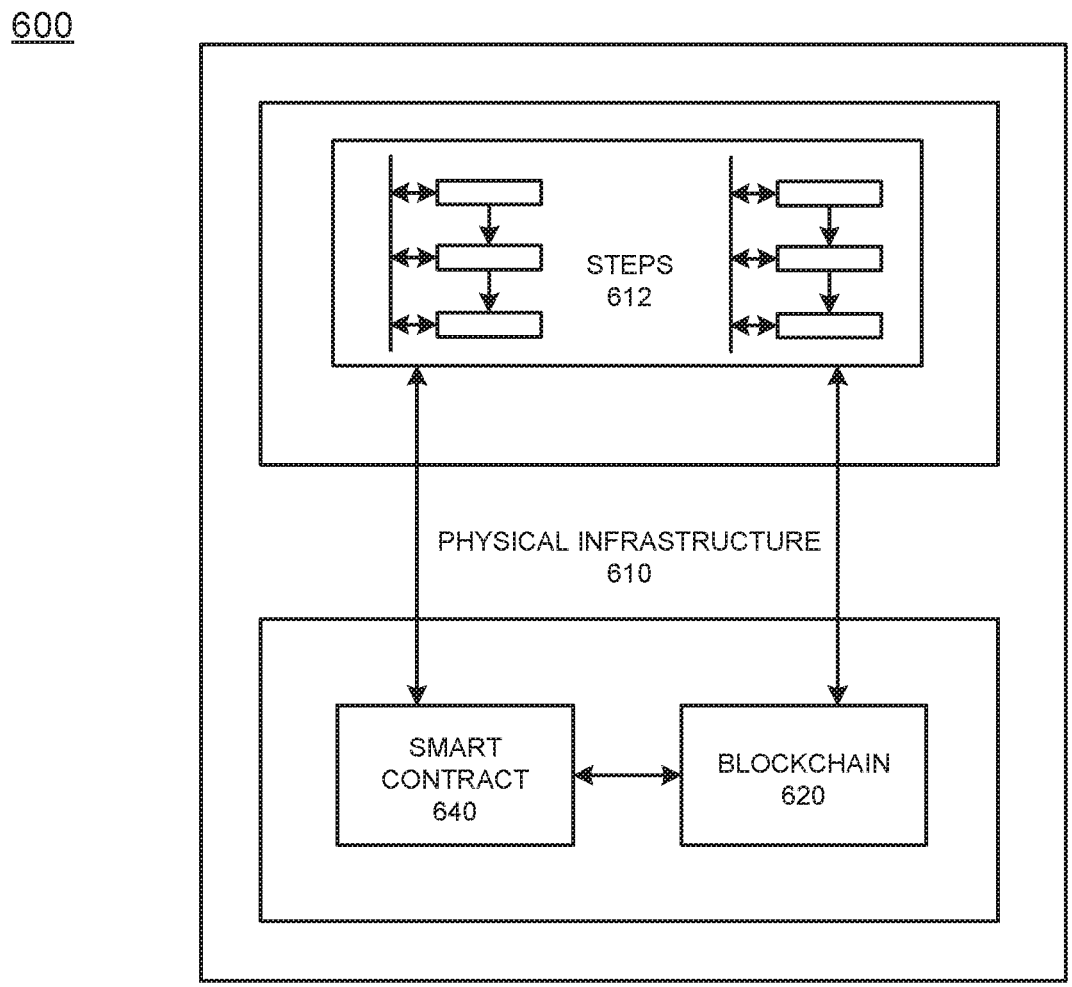
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
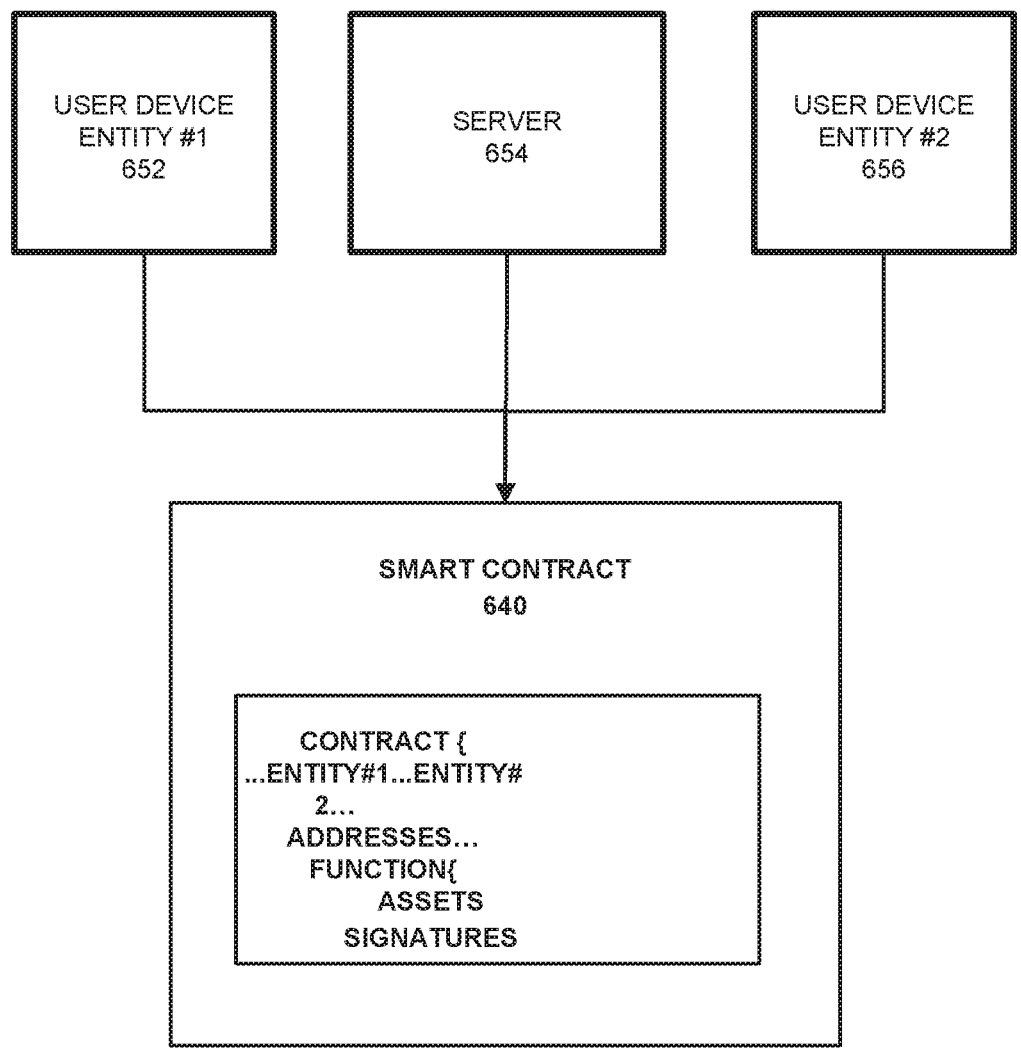
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
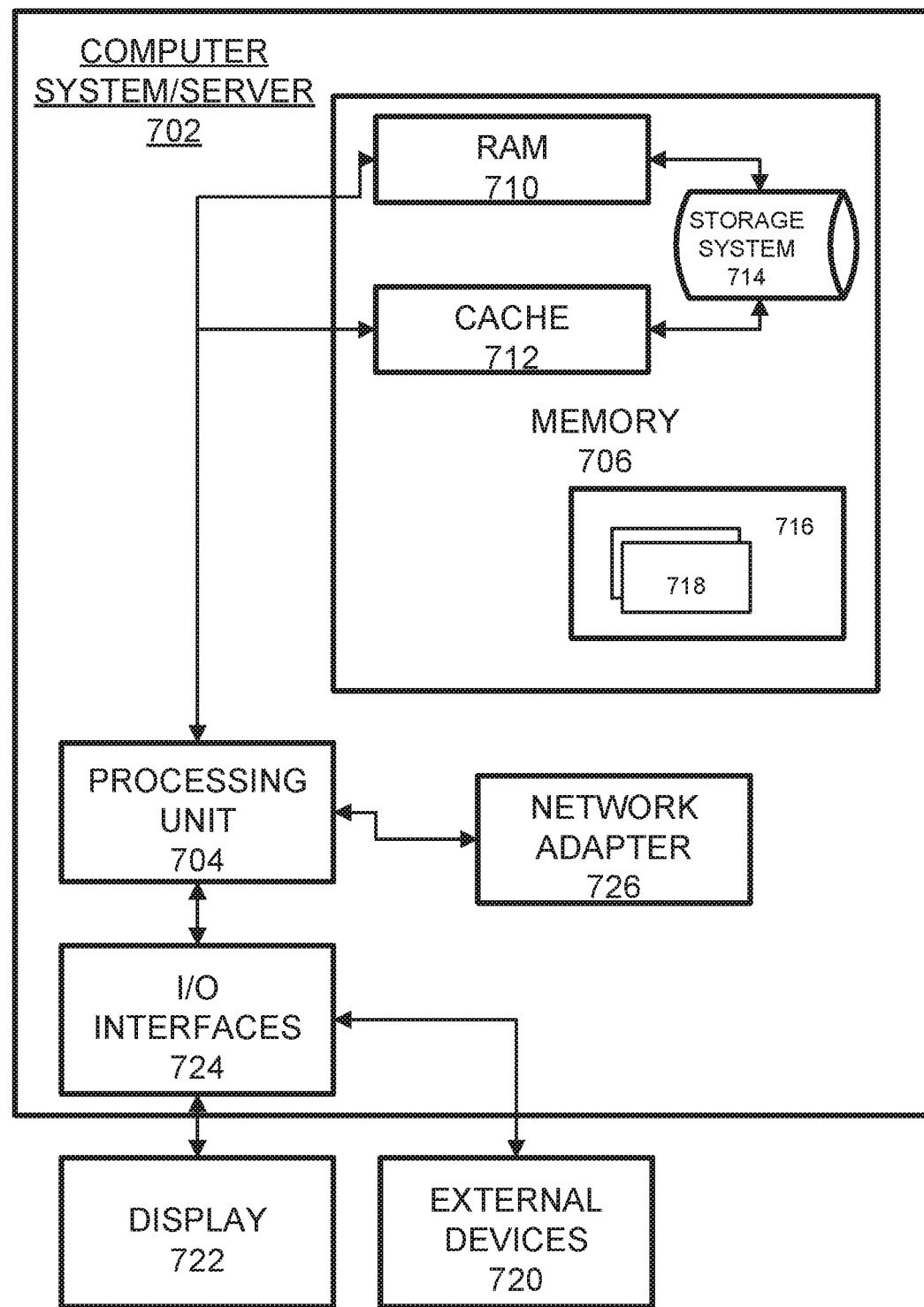
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
  applying a verifiable random function to a public key of a user of a blockchain that submitted a transaction and a hash of a previous block on the blockchain to generate an output;
  determining a pseudo-random value for the transaction by applying a function f to the output generated by the verifiable random function;
  randomly ordering a group of transactions including the transaction in a block of the blockchain based on the determined pseudo-random value of the transaction in comparison to respective pseudo-random values of other transactions in the group of transactions; and
  committing the block including the randomly ordered group of transactions to a hash-linked chain of blocks stored on a distributed ledger.

2. The method of claim 1, wherein the determining comprises creating a pseudo-random number by applying the function f to the output.

3. The method of claim 1, further comprising determining a respective pseudo-random value for each transaction among the group of transactions included in the block based on the random verifiable function and the function f.

4. The method of claim 1, further comprising determining that the transaction has been submitted, and associating the transaction to the hash of the previous block on the blockchain.

5. The method of claim 4, further comprising including the hash of the previous block inside a signed payload of the transaction.

6. A system, comprising:
  a memory; and
  a processor configured to:
    apply a verifiable random function to a public key of a user of a blockchain that submitted a transaction and a hash of a previous block on the blockchain to generate an output;
    determine a pseudo-random value for the transaction by applying a function f to the output generated by the verifiable random function; and
    randomly order a group of transactions including the transaction in a block of the blockchain based on the determined pseudo-random value of the transaction in comparison to respective pseudo-random values of other transactions in the group of transactions; and
    commit the block including the randomly ordered group of transactions to a hash-linked chain of blocks stored on a distributed ledger.

7. The system of claim 6, wherein the processor is configured to create a pseudo-random number by applying the function f to the output.

8. The system of claim 6, wherein the processor is further configured to determine a respective pseudo-random value for each transaction in the group of transactions included in the block based on the random verifiable function and the function f.

9. The system of claim 6, wherein the processor is further configured to determine that the transaction has been submitted and associate the transaction to the hash of the previous block.

10. The system of claim 9, wherein the processor is configured to include the hash of the previous block inside a signed payload of the transaction.

11. A non-transitory computer readable medium comprising instructions, that when read by a processor, cause the processor to perform a method comprising:
  applying a verifiable random function to a public key of a user of a blockchain that submitted a transaction and a hash of a previous block on the blockchain to generate an output;
  determining a pseudo-random value for the transaction by applying a function f to the output generated by the verifiable random function;
  randomly ordering a group of transactions including the transaction in a block of the blockchain based on the determined pseudo-random value of the transaction in comparison to respective pseudo-random values of other transactions in the group of transactions; and
  committing the block including the randomly ordered group of transactions to a hash-linked chain of blocks stored on a distributed ledger.

12. The non-transitory computer readable medium comprising instructions of claim 11, wherein the determining comprises creating a pseudo-random number by applying the function f to the output.

13. The non-transitory computer readable medium comprising instructions of claim 11, wherein the method further comprises determining a respective pseudo-random value for each transaction among the group of transactions included in the block based on the random verifiable function and the function f.

14. The non-transitory computer readable medium comprising instructions of claim 11, wherein the method further comprises including the hash of the previous block inside a signed payload of the transaction.

* * * * *